C. A. COSTIGAN.
PASTRY BAKING MACHINE.
APPLICATION FILED MAY 27, 1916.

1,262,923.

Patented Apr. 16, 1918.
4 SHEETS—SHEET 1.

INVENTOR
Charles A. Costigan
BY
ATTORNEY

C. A. COSTIGAN.
PASTRY BAKING MACHINE.
APPLICATION FILED MAY 27, 1916.

1,262,923.

Patented Apr. 16, 1918.
4 SHEETS—SHEET 2.

INVENTOR
Charles A. Costigan

BY
William A. Stock
ATTORNEY

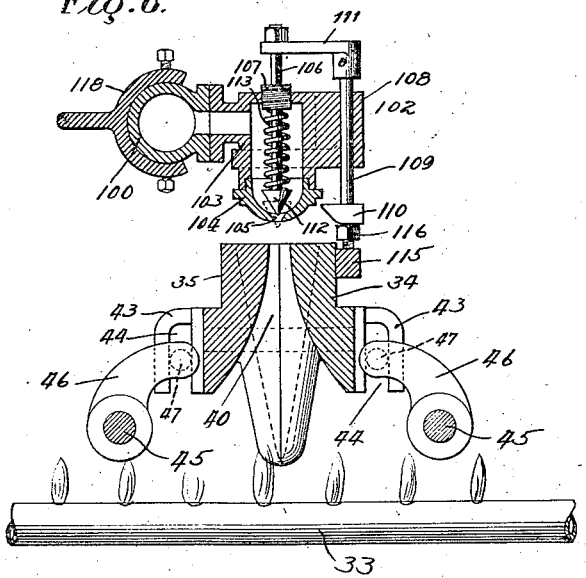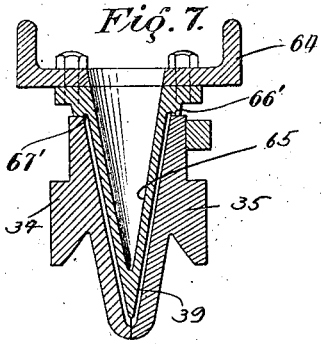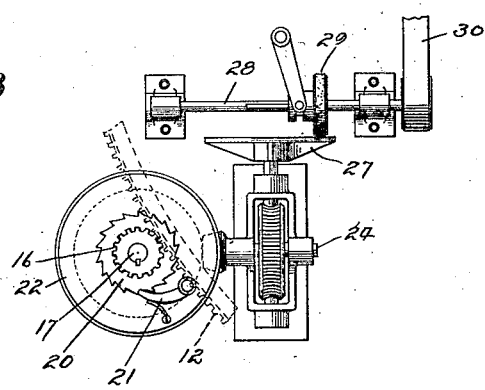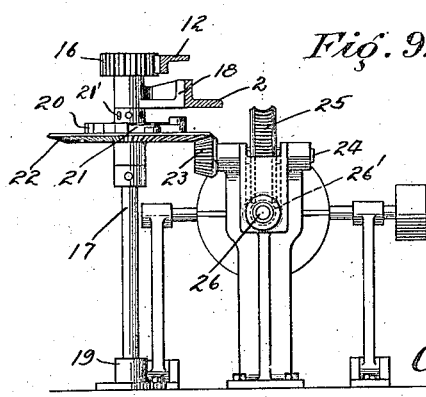

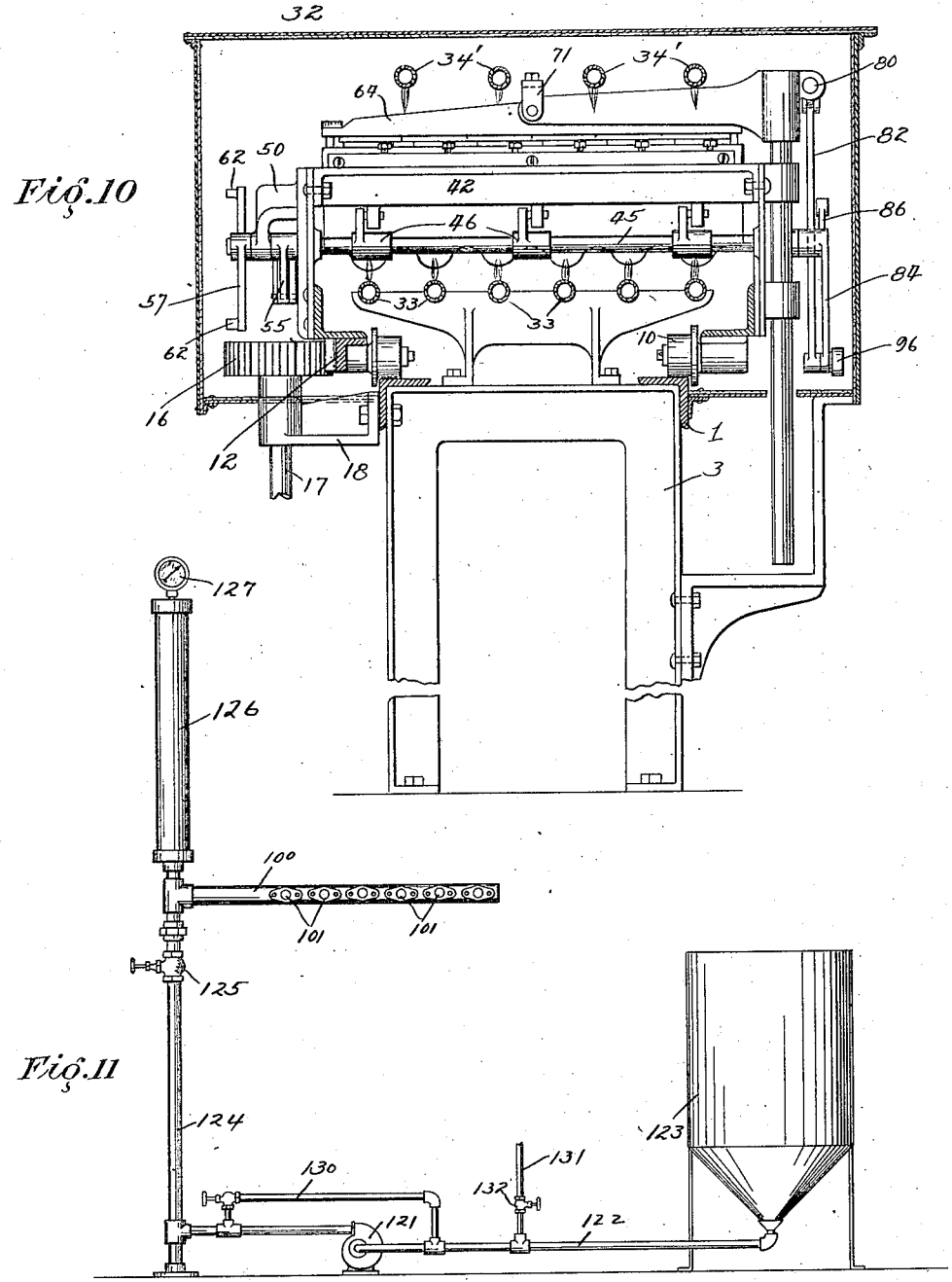

ए

UNITED STATES PATENT OFFICE.

CHARLES A. COSTIGAN, OF OAKLAND, CALIFORNIA.

PASTRY-BAKING MACHINE.

1,262,923.              Specification of Letters Patent.      Patented Apr. 16, 1918.

Application filed May 27, 1916.  Serial No. 100,408.

*To all whom it may concern:*

Be it known that I, CHARLES A. COSTIGAN, citizen of the United States, residing at Oakland, in the county of Alameda and State of California, have invented certain new and useful Improvements in Pastry-Baking Machines, of which the following is a specification.

This invention relates to that class of pastry making machines which is particularly adapted to the baking of ice-cream cones and similar articles.

The invention consists broadly of a revoluble table or wheel carrying a plurality of dies and their coöperating plungers, between which the article to be baked is molded.

The principal object of my invention is to provide a device of this character which is simpler in construction than similar devices heretofore used.

Another object of my invention is to provide improved means for opening the mold and discharging the contents therefrom.

Still another object of my invention is to provide locking devices whereby the plunger member is locked in position during the baking operation and released at the proper time.

Still another object of my invention is to provide an improved form of mold whereby a smooth round edge is produced around the upper edge of the cone a d in connection with the production of a cone of this character I provide means for individually regulating a quantity of batter placed in each mold so that exactly the required amount is injected during the filling operation, thereby eliminating waste and the expense of trimming incidental to many machines of this character.

With these and other objects in view the invention consists in the novel construction and combination and arrangement of parts as herein illustrated and more particularly pointed out in the appended claims.

Referring to the accompanying drawings.

Fig. 6 is an enlarged view in section through the die-plates and the filling valves.

Fig. 7 is a view in section through the mold showing the die parts and plunger in position as during the baking operation.

Fig. 8 is a view in plan showing the driving mechanism.

Fig. 9 is a view in elevation of same.

Fig. 10 is a view in section through the machine showing the parts in their closed position within the oven.

Fig. 11 is a diagrammatical view showing the manner in which the batter is handled.

Referring to the corresponding parts in the several views by the same numerals of reference:

Figure 1:
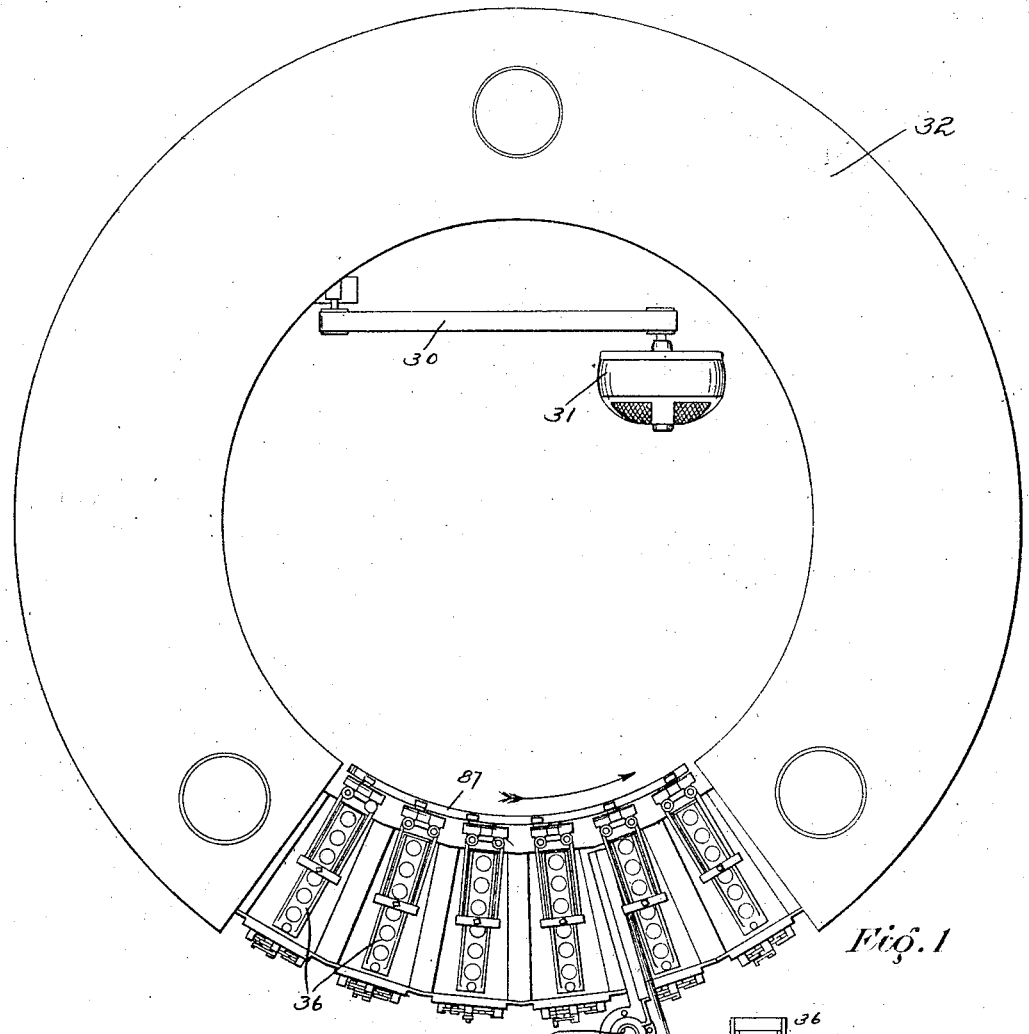
Figure 1 is a view in plan showing my improved machine with the oven casing in position.
Figure 2:
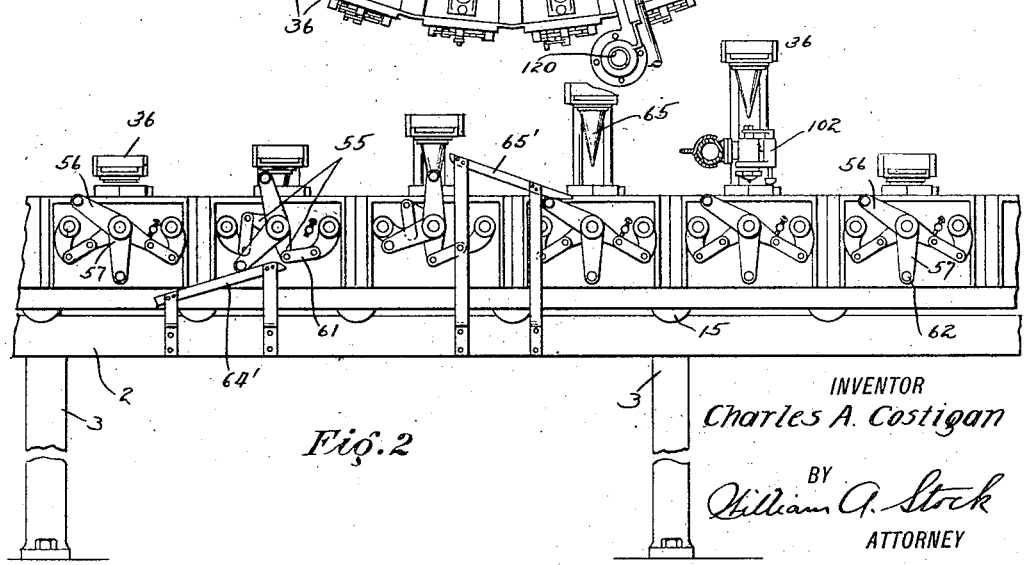
Fig. 2 is a view in front elevation of those molds wherein the discharge and refilling operations take place.

The frame work of the machine consists of angles 1 and 2 bent in circular form thereby providing trackways on which the table rotates. These angles are held in spaced relation and supported at a convenient height from the floor by suitable stands 3.

The rotating portion of the machine consists of a plurality of unit mechanisms, each of which is identical with the other. Each of these mechanisms consists of a front plate 4, a rear plate 5, attached to angles 6 and 7, respectively, these angles being in like manner bent in circular shape and concentric to angles 1 and 2. On the under side of angle 7 are attached brackets 8 in which are shafts 9 and on the latter are revolubly mounted the flange wheels 10. Attached to the front angle 6 is a toothed spur gear 12 having at suitable intervals lugs 13 wherein is mounted shafts 14 on which are journaled the flange wheels 15. The wheel 10 travels on angle 1 as its track-way, while wheel 15 travels on angle 2 as its track-way.

The drive for the rotating portion of the machine consists of a pinion 16 which meshes with the gear 12. This pinion is keyed to the vertical shaft 17 journaled in a bracket 18 attached to angle 2 and a step bearing 19 bolted to the floor. 20 denotes a ratchet wheel keyed to shaft 17 and which is driven by a pawl 21 pivotally mounted on the upper surface of a toothed beveled gear 22. This gear is revolubly mounted on shaft 17 and is driven by the toothed bevel pinion 23, this pinion being mounted on shaft 24 which in turn is driven by the worm wheel 25. The latter is driven by a worm 26' mounted on shaft 26 to the outer end of which is keyed a friction disk 27. 28 denotes a shaft journaled parallel to the face of disk 27 having a friction wheel 29 mounted thereon on a feather key. This shaft is driven by suitable means such as a belt 30 and a motor 31.

The various units comprising the machine are surrounded by casing 32, rectangular in outline and within which is a plurality of gas pipes 33 below the molds having perforations in their upper surfaces and pipes 34' above the molds having perforations in their lower surfaces. This casing and the gas pipes embrace all the units except six which are shown in Fig. 1 and at which position the various operations of discharging the baked cones and refilling the mold take place.

Each mold consists of three parts: the side plates of the die denoted by 34 and 35 and the plunger denoted by 36. The die plates are slidably mounted in suitable guides 37 and 38 formed on the inner surface of the front and rear plates, respectively. These die plates contain conical recesses 39 in which the cornucopias are baked. In addition I have provided passage ways 40 extending upwardly through the die between each conical recess, whereby the heat from the gas pipe below may ascend upwardly in intimate contact with the material surrounding the various conical recesses. The various plates 4 and 5 are held in fixed radial relation by means of bars 42 extending from one plate to the other and securely bolted to each. The sides of each die plate are provided with lugs 43 having a vertical slot 44 and oscillatively mounted in the front and rear plates are shafts 45, these shafts between the plates being provided with arms 46 having pins 47 which are adapted to enter the slots in lugs 43.

Extending outwardly from the front plate is an arm 50, wherein is journaled a shaft 51, this shaft having keyed to it bell crank levers 52 and 53, the former having arms 55, the latter having an arm 56 and an arm 57. On the outside of plate 4 shafts 45 are provided with lever arms 60 which are connected to the ends of the bell crank arms 55 by means of links 61. Both the arms 56 and 57 have cylindrical lugs 62 formed on the ends which are adapted to contact with suitable cam surfaces for the purpose of opening and closing the die plates. The upwardly inclined cam surface 64' is provided in the path of the lug 62 on arm 56. A pin 134 extends outwardly from the face of plate 4 and in threaded engagement therewith is an adjusting screw 135.

The plunger comprises the plate 64 to which is bolted the conical members 65, the number equal to the recesses 39 in the die plates. The ends of the plates 64 are provided with dowel pins 66 adapted to engage corresponding holes 67 in the ends of the die plates. On the rear of plate 5 are formed a plurality of lugs 67 and 68 having vertical openings in which the rods 69 are slidably mounted. To the upper end of these rods is attached a yoke member 70, this member having arms extending outwardly to a point adjacent the center between plates 4 and 5. A yoke 71 is pivotally mounted on the outer ends of these arms and to the center of this bar is tightly clamped the member 36 by suitable nuts.

Figure 3:
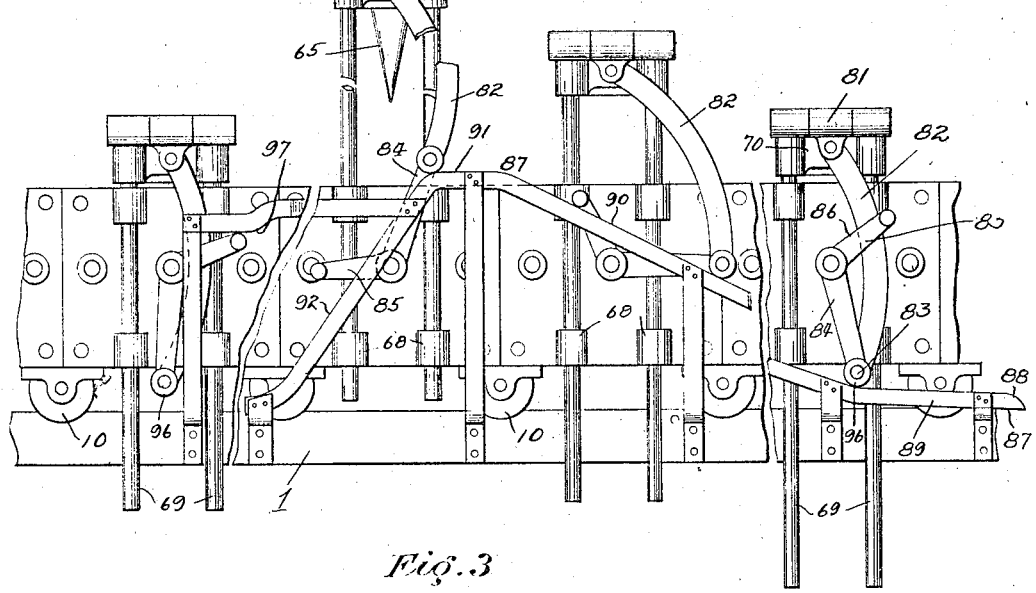
Fig. 3 is a view in rear elevation of the same sections showing the manner in which the plungers are raised, lowered and locked.

The plunger 36 is raised and lowered by the mechanism to enable the molds to be filled, as shown in Fig. 3. This mechanism consists of the shaft 80 journaled in a horizontal direction in the yoke member 70 and having mounted thereon member 81. This member is provided with ears in which is pivotally mounted one end of a curved link 82. The lower end of this link is pivotally mounted on pin 83 held in the end of arm 84 of the bell crank lever 85. This lever has a second arm 86 which is used to lock the plunger in its closed position. The opening of the mold is accomplished by the inclined member 87, having the curved contact end 88, the substantial horizontal section 89 and the upwardly inclined surface 90. Continuing from the latter is a short horizontal section 91 and then a sharp downwardly inclined portion 92.

A roller 96 is pivotally mounted on the pin 83 and arranged to travel on the upper surface of this track 87. Thus when the roller contacts with the curved portion 88, the lever 86 is moved slightly in a counter clock-wise direction which very slightly raises the plunger portion of the mold out of the die portion. This position is held while the die sections are moved apart sufficient to allow the baked cones to drop through the bottom of the dies. The plunger is then raised to a sufficient height to enable it to clear the pump mechanism hereinafter described. The inclined surface 92 smoothly lowers the plunger after the molds have been filled. After this portion of the device has been lowered the mechanism is locked in its closed position by the pin 83 being moved past the center connecting the upper pivotal point of link 82, on the center of which the bell crank is mounted. This locking operation is effected by means of arm 86 contacting with the cam surface 97, which rotates the bell crank lever in a clock-wise fashion until the inner edge of the link contacts with the hub of the bell crank lever.

The mechanism by which the molds are filled is more particularly illustrated in

Figs. 6 and 11. It consists of a tubular member 100 having openings 101 to which are attached the valve mechanisms 102, there being one of these valves for each line of recesses 39. Each of these valve mechanisms consists of a circular casing 103 having a removable cap 104 in which is a conical opening 105. The valve rod 106 is slidably mounted in a bushing 107 on the inner part of valve casing. Each of the valve casings are attached to the tubular member 100 by means of suitable bolts. An extension 108 is provided on one side of the casing on which is slidably mounted a rod 109 having a shoe 110 on the lower end and having an arm 111 attached to its upper end. This arm extends laterally and connects to the upper end of the valve rod 106. On the lower end of the latter is provided a conical valve disk 112. Interpositioned between the latter and bushing 107 is a spring 113 by which the valve is closed. On the side of the die member is attached a strip 115 in which are screwed a number of adjustable studs 116, these studs lying in the path of the members 110. By this means each valve mechanism is lifted as these studs pass under the same and thus by adjusting the height of these studs the valve may be lifted just sufficiently to allow the correct amount of batter to flow to fill that particular mold.

The tubular member 100 is held in casing 118, the outer end of which is securely attached to an upright post 120. The batter is forced into these valves under pressure as shown diagrammatically in Fig. 11, by a rotary pump drawing batter through 122 from the storage reservoir 123. This pump discharges into the pipe 124 which is connected with the tubular member 100 and a valve 125 is placed in this line. An air chamber 126 is also connected to this pipe line and an indicating gage 127 provided on the upper end of the air chamber. A valved by-pass 130 is provided around the pump whereby the pressure maintained may be regulated by allowing more or less of the batter to flow around the pump. 131 denotes a connection leading from source of water supply provided by 132 by which more or less water may be mingled with the batter, should necessity so demand, and by which the pipes may be flushed after use.

The operation is as follows:

When motor 31 is started it drives shaft 28 and through the friction wheel 29 and disk 27 drives the worm 26'. The worm in turn drives the wheel 25 keyed to shaft 24 causing the toothed bevel wheel 23 to drive the toothed bevel 22. The latter through the pawl 21 drives ratchet wheel 20 and this wheel being keyed to shaft 21 causes the rotation of the latter. Toothed pinion 16 which meshes with the gear 12 causes the rotation of this gear together with the various baking units supported on the wheels 10 and 15. This entire mechanism forms one large wheel which rotates on the trackways 1 and 2, and during the greater part of a revolution being incased within the oven 32. By means of this form of drive the speed of the rotating structure can be varied so as to allow the mold to remain within the oven the correct time to suitably bake the contents. The ratchet connection between the toothed bevel gear and the shaft 17 permits the latter to be rotated slowly without the use of the motor. Thus by providing suitable holes 21' through the hub of ratchet 20 and inserting a bar through these holes in order to provide sufficient leverage, the structure may be slowly rotated in order to bring any desired mold to a given point.

As illustrated in Fig. 1 the rotating structure moves in the direction of the arrow. As the molds emerge from the oven, the plunger mechanism on the back is unlocked as shown in Fig. 3, and slightly raised so as to separate the cores of the plungers from the inside of the baked cones. As soon as this separation is effected, the two parts 34 and 35 of the die are moved apart by means of the cam surface 64' with which the arm 57 contacts. This rotates the two shafts 45 separating the halves of the die, permitting the cones to drop through the bottom to a suitable conveyer (not shown) by which they are carried away. During this separating of the die parts the plunger 36 is but slightly raised, thereby preventing the cones from following either half of the die. During the latter part of the opening of the die plate the plunger is being raised by means of the inclined surface 90. The mold then closes so that by the time it has covered five-sixths the distance between the ends of the oven the plunger has reached its highest elevation and the mold is again closed and locked, the closing and locking being effected by means of the arm 56 contacting with the inclined surface 65'. When the molds reach this position they are directly under the valves of the feed mechanism and the studs 116 contact with the shoes 110, thereby opening the valves and allowing a small quantity of batter to be ejected into each recess. The pump 121 maintains considerable pressure within the feed pipe of this filling mechanism whereby a very short interval is required to squirt the batter into the mold recess rendering it unnecessary to stop the machine while this operation is performing. During the time the plunger is over the feed mechanism the roller 96 is on the flat portion 91 of track-way 87, and immediately thereafter starts down the inclined surface 92. When the plunger has reached its closed position the arm 86 contacts with the curved cam surface 97, thereby throwing the lower end of the levers on the other side of the line connecting the pivot point of the bell crank 85 and the upper end of arm 82, effectively locking the plunger in position and so preventing the pressure of the baking material from forcing it upward. The unit now enters the oven where gas jets are directed toward the bottom and on the top so that the bottom of the molds is heated by direct contact with the flame by pipes 33 and the plunger by contact with the flame by pipes 34'. In addition the heated air from the bottom gas burner follows up through the cavities 40 between each recess, thereby keeping all parts at a uniform temperature.

When the two halves of the die are closed, the arms 55 and links 61 are in a straight line, and in order to prevent the internal pressure within the mold from forcing the halves apart, I cause the pivot point between the lever arms 55 and the links 61 to move slightly past this straight line. The amount of such movement is regulated by screw 135 extending through pin 134.

Figure 5:
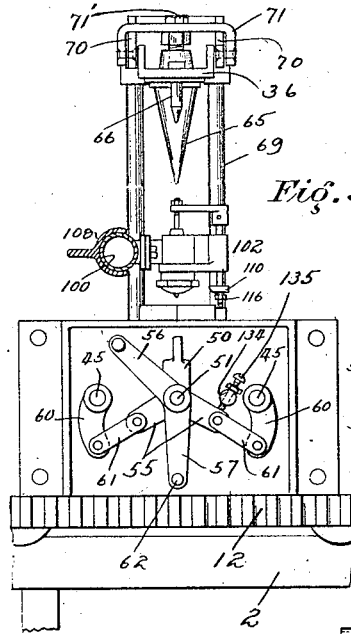
Fig. 5 is an enlarged view in front elevation of the portion of the device shown in Fig. 4.
Figure 4:
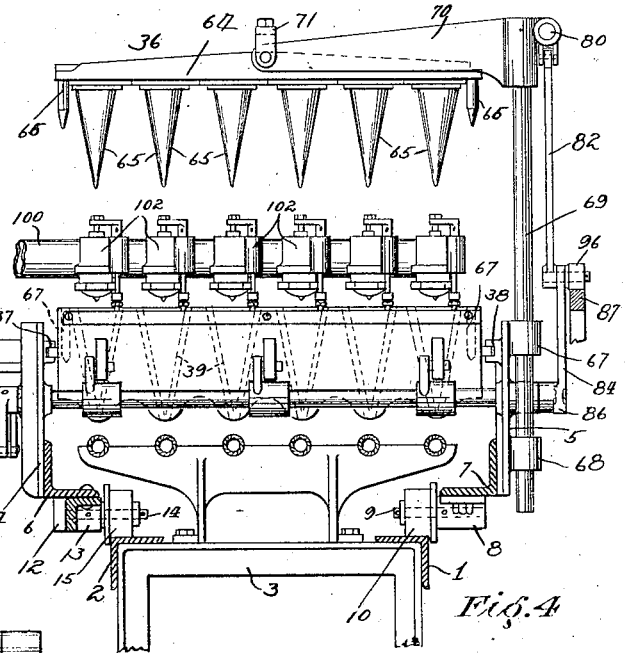
Fig. 4 is a view in section through the machine at the point where the mold is filled.

As shown in Fig. 7, conical members 65 are provided with a shoulder 66' having a semicircular annular recess 67'. The face of the shoulder rests on the upper surface of the die parts and in order that the plunger shall fit tightly on the die, I provide the adjustment shown in Fig. 5. Plate 64 is rigidly attached to the yoke 71, but capable of being vertically adjustable by means of the screw 71', which is in threaded engagement with a lug on the inside of plate 64. The yoke itself is pivotally attached to arms of member 70, whereby when the plunger is lowered the plate may seat itself on the upper surface of the die parts and the amount of pressure brought to bear thereon is regulated by the screw 71'. Thus by these various devices I provide means by which the amount of batter placed in each recess is accurately regulated, and a mold which will prevent the overflow of batter.

While I have shown the preferred embodiment of my invention it will be understood that minor changes may be made in details of construction and design without departing from the scope of the claims.

I claim as new and wish to cover by Letters Patent:—

1. An apparatus of the class described comprising a rotatable wheel, a plurality of molds carried by said wheel, each mold having a plurality of baking cavities, a plurality of cores adapted to be positioned in said cavities, means for raising said cores above said molds, a plurality of valves under which the cavities in said molds are adapted to be positioned when said cores are raised, and means carried adjacent each of said mold cavities adapted to operate the valve over that cavity an amount corresponding with the capacity of that mold.

2. An apparatus of the class described comprising a rotatable wheel, a plurality of molds carried by said wheel each mold having a plurality of baking cavities, a plurality of valves corresponding in number to the cavities in the molds and under which said mold cavities are adapted to be positioned and means carried by said molds adjacent each cavity thereof for varying the opening of the valve positioned thereover in accordance with the capacity of that cavity.

3. An apparatus of the class described comprising a continuously rotatable wheel, a plurality of molds carried by said wheel each mold having a plurality of baking cavities in radial alinement, a frame pivotally mounted intermediate its ends, the axis of said frame being at right angles to the length of said mold and parallel to the upper surface thereof, and cores carried by said frame adapted to be positioned within said cavities.

4. An apparatus of the class described comprising a rotatable wheel, a plurality of molds carried by said wheel each mold having a plurality of baking cavities, a plurality of loading valves, said mold cavities being adapted to be positioned under said valves at a predetermined position, a vertically movable lift rod carried by each of said valves, and adjustable abutments carried by said molds adapted to move said lift rods and open each valve independently of any other valve.

5. An apparatus of the class described comprising a continuously rotatable wheel, a plurality of molds carried by said wheel each mold having a plurality of recesses, means for opening said molds, means for closing and locking said molds, a plurality of filling valves positioned over the path of said recesses, a vertically movable lift rod for opening each of said valves, a contact shoe on the lower ends of said lift rods, and a plurality of abutments carried by said molds coöperating with said contact shoes when said valves are positioned over the recesses of a mold.

6. An apparatus of the class described comprising a continuously rotatable wheel, a plurality of molds carried by said wheel, each mold having a plurality of recesses, means for discharging the contents of said molds, a plurality of independently operable loading valves positioned above the line of travel of said recesses, an operating rod carried by each of said valves, and a plurality of adjustable abutments on each of said molds for moving said rods when said valves are positioned over said cavities.

7. An apparatus of the class described comprising a continuously rotatable wheel,